United States Patent
Kasargod et al.

(10) Patent No.: US 11,115,068 B2
(45) Date of Patent: Sep. 7, 2021

(54) DATA-BASED PRE-DISTORTION FOR NONLINEAR POWER AMPLIFIER

(71) Applicant: Cypress Semiconductor Corporation, San Jose, CA (US)

(72) Inventors: Sudhir Kumar Kasargod, Bangalore (IN); Ayush Sood, Bangalore (IN); Kempraju G, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/727,786

(22) Filed: Dec. 26, 2019

(65) Prior Publication Data
US 2021/0203369 A1 Jul. 1, 2021

(51) Int. Cl.
*H04B 1/04* (2006.01)

(52) U.S. Cl.
CPC ... *H04B 1/0475* (2013.01); *H04B 2001/0425* (2013.01)

(58) Field of Classification Search
CPC ............. H04B 1/0475; H04B 2001/0425
See application file for complete search history.

(56) References Cited

U.S. PATENT DOCUMENTS

| 7,929,917 | B1* | 4/2011 | Morris | H04B 17/14 375/141 |
| 8,391,809 | B1* | 3/2013 | Fuller | H04B 1/0475 455/114.3 |
| 2012/0002752 | A1* | 1/2012 | Coan | H04B 1/0475 375/297 |
| 2014/0254716 | A1* | 9/2014 | Zhou | H03F 1/3247 375/296 |
| 2015/0171899 | A1* | 6/2015 | Kim | H03F 1/3247 375/297 |
| 2018/0287569 | A1* | 10/2018 | Xu | H03F 1/3282 |
| 2019/0326942 | A1* | 10/2019 | Spring | H04B 1/0458 |
| 2020/0036337 | A1* | 1/2020 | Khlat | H03F 3/211 |

* cited by examiner

*Primary Examiner* — Dhaval V Patel

(57) ABSTRACT

A system for data-based pre-distortion for a nonlinear power amplifier includes a digital pre-distortion (DPD) component, including a DPD processor and a DPD calibration engine, where the DPD processor applies a set of DPD coefficients to a digital baseband data signal, to generate a pre-distorted digital baseband data signal for conversion to a radio frequency (RF) signal and amplification by a nonlinear power amplifier (PA) to generate an RF output signal, where the DPD calibration engine compares a digitized, down-converted version of the RF output signal with the digital baseband data signal, to determine distortion coefficients of the nonlinear PA, and to update the set of pre-distortion coefficients in the DPD processor to compensate for the distortion coefficients of the non-linear PA, where data transmission is uninterrupted by the transmission of non-data calibration signals.

20 Claims, 8 Drawing Sheets

DATA-BASED PRE-DISTORTION FOR NONLINEAR POWER AMPLIFIER

FIELD

The present disclosure is directed to compensating for nonlinearities in a power amplifier using digital pre-distortion and, more particularly, to performing pre-distortion calibration without interrupting data throughput.

BACKGROUND

In wireless communication networks, such as wireless local area networks (WLANs) and cellular networks, the power amplifier must highly linear to avoid amplitude and phase distortion that can create data errors. If the power amplifier is biased for best linearity over the amplitude variations of the input signal, the power consumption of the power amplifier increases and efficiency decreases. If the power amplifier is biased for higher efficiency, then the amplifier becomes nonlinear, especially at the highest amplitudes of the input signal.

Pre-distortion of the input signal has been used to compensate for nonlinearities in a power amplifier, but the process of characterizing the nonlinearity of the power amplifier uses non-data calibration signals that interrupt the flow of data. This interruption can be significant because the nonlinearity of the power amplifier varies over time with signal levels, and with signal level dependent power consumption that affects the temperature of the power amplifier. As a result, the data interrupting calibration process is performed periodically on a timer cycle, whether or not the calibration is actually needed.

BRIEF DESCRIPTION OF THE DRAWINGS

For a more complete understanding of various examples, reference is now made to the following detailed description taken in connection with the accompanying drawings in which like identifiers correspond to like elements.

DETAILED DESCRIPTION

Figure 1:
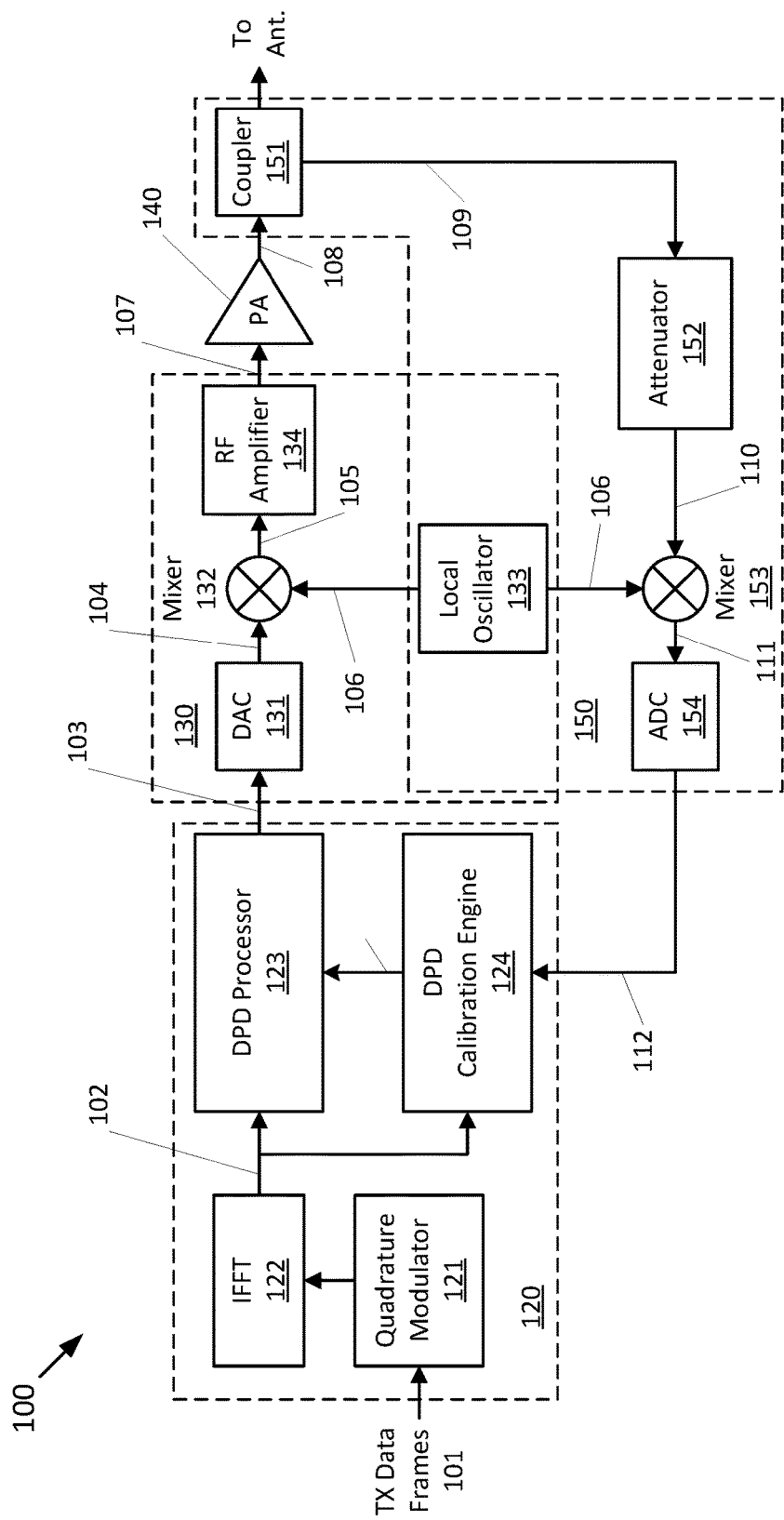
FIG. 1 is a block diagram illustrating an example system for data-based pre-distortion for a nonlinear power amplifier according to the present disclosure.

Aspects of the present disclosure are directed to characterizing and compensating for the nonlinearities of a power amplifier in a wireless communication system without interrupting the flow of data.

In one example, a transmitter system, such as the transmitter in a wireless access point, a wireless client device (e.g. a smartphone, tablet computer or laptop computer), a cellular base station or a cellphone, includes a digital pre-distortion (DPD) component including a DPD processor and a DPD calibration engine, where the DPD processor is configured to apply a set of DPD coefficients to a digital baseband data signal. The DPD processor is further configured to generate a pre-distorted digital baseband data signal for conversion to a radio frequency (RF) signal and amplification by a nonlinear power amplifier (PA) to generate an RF output signal.

The DPD calibration engine is configured to compare a digitized, down-converted version of the RF output signal with the digital baseband data signal, to determine distortion coefficients of the nonlinear PA, and to update the set of pre-distortion coefficients in the DPD processor to compensate for the distortion coefficients of the non-linear PA, where data transmission is not interrupted by the transmission of non-data calibration signals.

In one example, the transmitter system includes an up-converter component, coupled with the DPD processor, where the up-converter component is configured to convert the pre-distorted digital baseband data signal into the radio frequency (RF) signal, where the RF signal is a variable-envelope signal. The transmitter system also includes a nonlinear power amplifier (PA), coupled with the up-converter component, where the nonlinear PA is configured to generate the RF output signal. The transmitter system also includes a down-converter component, coupled with the PA and the DPD component, configured to convert the RF output signal to the digitized downconverted version of the RF output signal.

In one example, a method for correcting distortion in a nonlinear PA includes: pre-distorting a digital baseband data signal for conversion to a radio frequency (RF) signal, and amplification by a nonlinear power amplifier (PA) to generate an RF output signal; comparing a digitized, down-converted version of the RF output signal with the digital baseband data signal, to determine distortion coefficients of the non-linear PA; and updating a set of pre-distortion coefficients, based on the comparison, to compensate for the distortion coefficients of the nonlinear PA, where data transmission is uninterrupted by transmission of non-data calibration signals.

In one example, the method also includes: up-converting the pre-distorted digital baseband data signal to the RF signal; amplifying the RF signal with the non-linear PA to generate the RF output signal, where the RF signal is a variable-envelope RF signal; and downconverting and digitizing the RF output signal for comparison with the digital baseband data signal.

In one example, a DPD processing component includes a quadrature modulator configured to receive a transmit data frame; an inverse fast Fourier transform block coupled with the modulator to convert the modulator output to the time domain, a DPD calibration engine coupled to the IFFT block, configured to compare a digital baseband data signal from the IFFT block with a distorted version of the digital baseband data signal, and to generate DPD coefficients based on the comparison; and a DPD processor configured to receive the digital baseband data signal from the quadrature modulator and to pre-distort the digital baseband data signal using the DPD coefficients, where data transmission is uninterrupted by transmission of non-data calibration signals.

FIG. 1 is a block diagram of an example transmitter system 100 according to the present disclosure. Example transmitter system 100 includes a digital pre-distortion (DPD) component 120, an up-converter component 130, a nonlinear power amplifier (PA) 140, and a down-converter component 150.

Figure 2:
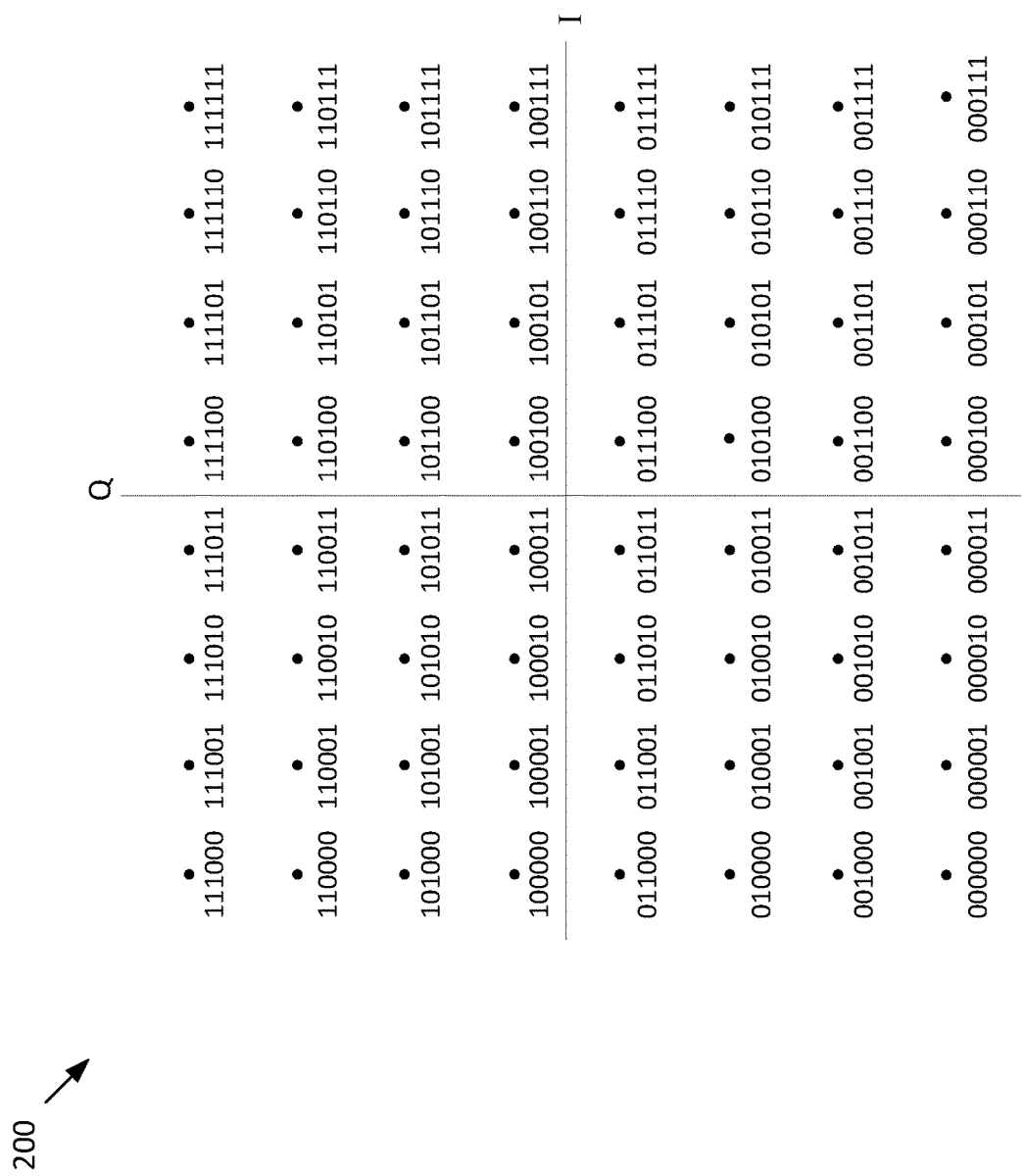
FIG. 2 is an example of a data constellation according to the present disclosure, illustrating symbol mapping.
Figure 3:
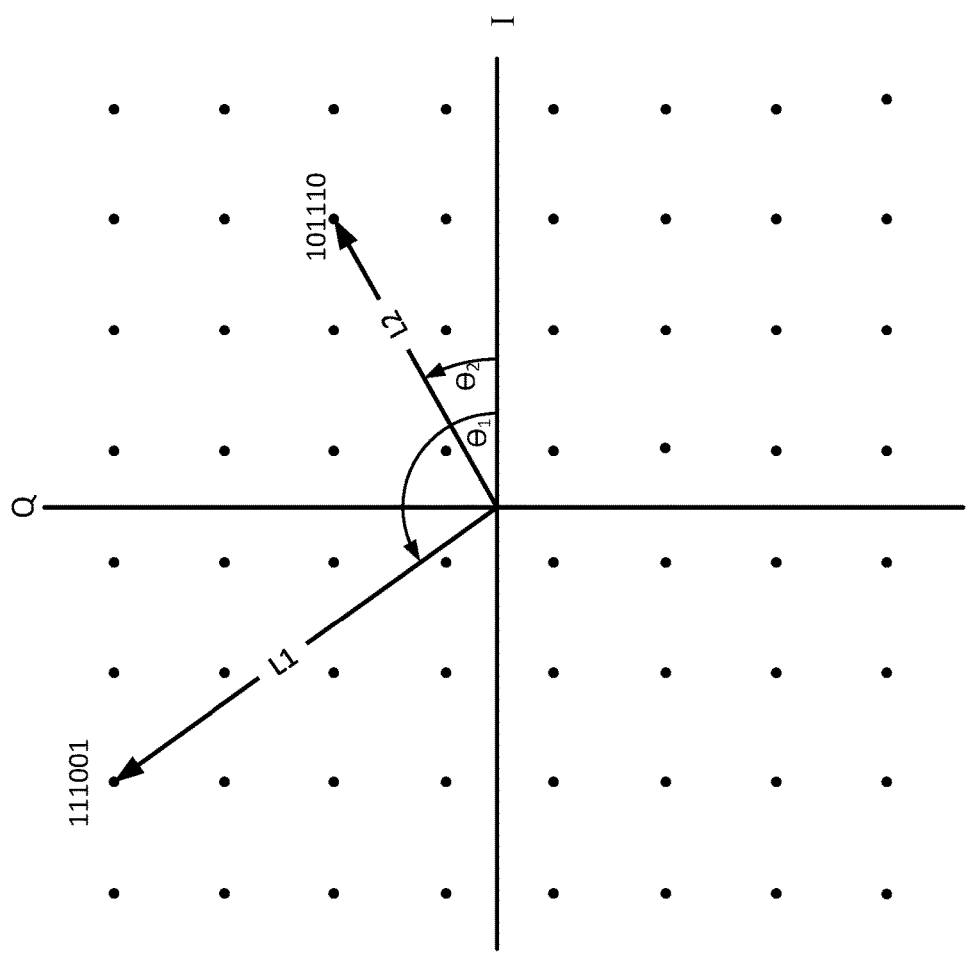
FIG. 3 is an example of a data constellation according to the present disclosure, illustrating digital-to-analog mapping.

DPD component 120 includes a quadrature modulator 121 that receives data frames 101 in the form of a bit stream, and generates symbols according to a quadrature modulation scheme such as 64-QAM or 256-QAM, for example. Such quadrature modulation schemes can be expressed in general as $2^N$-QAM, where N is the number of bits per symbol in the resulting modulation constellation. DPD component 120 also includes an IFFT block 122. IFFT block 122 prepares the output of the Quadrature Modulator 121 for loading onto the OFDM subcarriers. The output of the quadrature modulator is FIG. 2 illustrates an example of bit-mapping for a 64-QAM modulation scheme where all possible 6-bit symbols are uniquely mapped to one of 64 constellation points in the I-Q plane 200. As illustrated in FIG. 3, each unique point in the constellation can be associated with a unique vector from the origin of the I-Q plane 200 to the constellation point. For example, in FIG. 3, the vector between the origin and the constellation point representing the symbol 111001 can be represented by a vector of length L1 making an angle Θ1 with the I-axis, and the vector between the origin and the constellation point representing the symbol 101110 can be represented by a vector of length L2 making an angle Θ2 with the I-axis. This relationship between the digital symbol domain and the analog vector domain is used in the digital-to-analog conversion process described below.

The symbols generated by the quadrature modulator 121 are transformed by IFFT block 122 to a digital baseband data signal 102 in the time domain that is received by the DPD processor 123. As described in detail below, the DPD processor 123 applies a set of pre-distortion coefficients to the digital baseband data signal 102, based on look-up tables provided by the DPD calibration engine 124, to generate a pre-distorted digital baseband data signal 103.

The up-converter component 130 includes a digital-to-analog converter (DAC) 131, a mixer 132, a local oscillator 133 and a radio frequency (RF) amplifier 134. The DAC 131 receives the pre-distorted digital baseband data signal 103 and converts it to an analog baseband data signal 104 using the digital-symbol to analog-vector mapping described above. The analog baseband data signal 104 is up-converted to an RF signal 105 by mixer 132, using a local oscillator (LO) signal 106 provided by local oscillator 133. In one example, without limitation, the local oscillator signal may comprise OFDM (orthogonal frequency division multiplex) RF sub-carriers, for example in a 64-QAM system as described above. In each symbol period, each sub-carrier is modulated by mixer 132 with a vector corresponding to one of 64 consecutive symbols in the data stream. Accordingly, each sub-carrier will have an amplitude and phase corresponding to different symbols, resulting in a complex, combined RF signal 105 with a time-varying amplitude envelope. The RF signal 105 is then pre-amplified by RF amplifier 134 to produce an amplified RF signal 107 with a time-varying envelope, which may be characterized by a peak-to-average power ratio (PAPR).

The amplified RF signal 107 is applied to the input of power amplifier 140 at a power level where the PA 140 is operating in a non-linear region at the peak power levels of the amplified RF signal 107. At this power level, the PA 140 can operate with high efficiency, but at the peak power levels of the input signal, the output amplitude and phase is distorted.

Figure 4A:
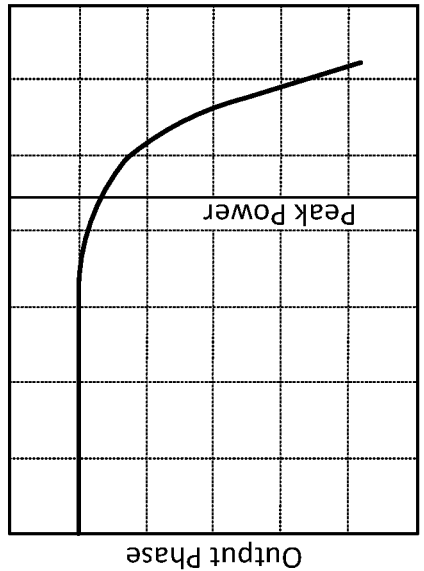
FIG. 4A is a graph illustrating an example of amplitude distortion in a nonlinear power amplifier according to the present disclosure.
Figure 4B:
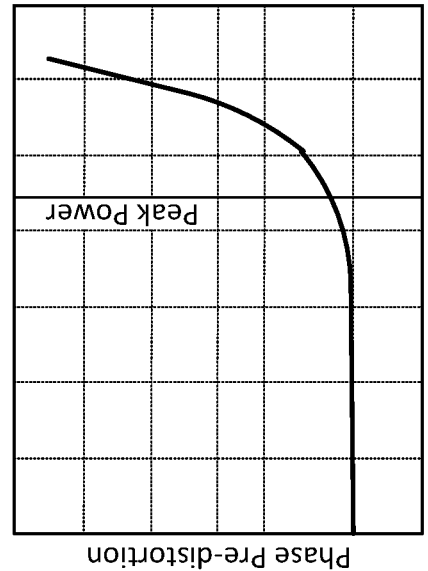
FIG. 4B is a graph illustrating an example of phase distortion in a nonlinear power amplifier according to the present disclosure.
Figure 4C:
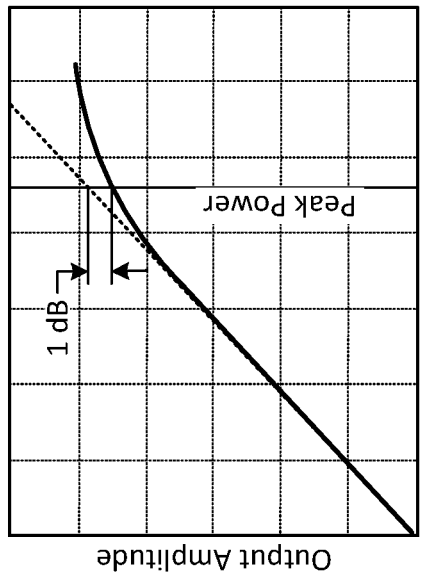
FIG. 4C is a graph illustrating an example of an amplitude pre-distortion function according to the present disclosure.
Figure 4D:
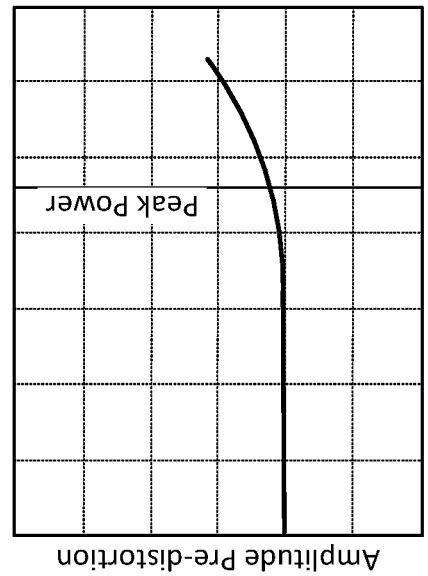
FIG. 4D is a graph illustrating an example of a phase pre-distortion function according to the present disclosure.

FIG. 4A illustrates the amplitude distortion of PA 140 as a function of input power, known as AM-to-AM (AM/AM) distortion. In the example of FIG. 4A, the peak input power is set at the 1 dB compression point of PA 140, but other operating points may be selected with more or less distortion. FIG. 4B illustrates the phase distortion of PA 140 as a function of input power, known as AM-to-PM (AM/PM) distortion. FIG. 4C illustrates the amplitude pre-distortion that is needed as a function of input power to compensate for the AM/AM distortion of the PA 140, and FIG. 4D illustrates the phase pre-distortion that is needed as a function of input power to compensate for the AM/PM distortion of the PA 140.

FIG. 5 is an example 64-QAM constellation diagram 500 illustrating the effects of the amplitude and phase distortion in PA 140, absent any pre-distortion of the RF input signal 107. In FIG. 5, the solid dots represent what the output of PA 130 would be in the absence of nonlinear distortion, while the circles represent the effects of amplitude and phase distortion due to the nonlinearity of PA 140. In FIG. 5, as in FIG. 3, the distance of a constellation point from the origin of the I-Q plane represents the amplitude of the sub-carrier assigned to that constellation point.

Figures 5A, 5B:
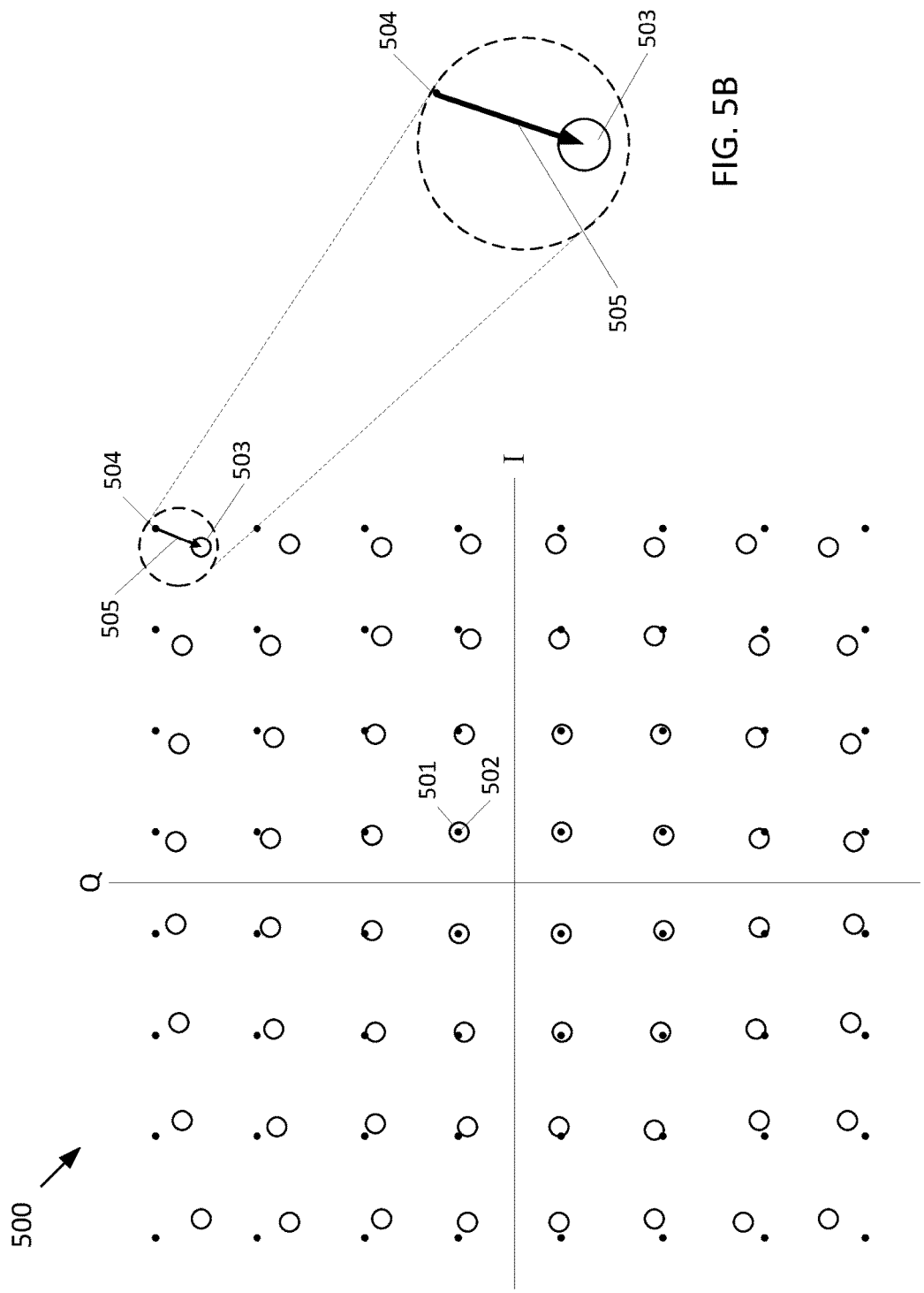
FIG. 5A is an example of a data constellation illustrating the effect of power amplifier nonlinearity according to the present disclosure.
FIG. 5B is a magnified view of the effect of power amplifier nonlinearity on a data symbol in the constellation of FIG. 5A.

As illustrated in FIG. 5A, the amplitude and phase difference between the ideal linear output of the PA 140 and the actual nonlinear output of the PA 140 increases with distance from the origin, corresponding to increasing power levels. For example, the actual output of the PA 140 (501) in FIG. 5, corresponding to symbol 100100 in FIG. 2, is almost identical to the ideal linear output 502, because the amplitude of the RF signal 107 component associated with that constellation point is relatively small compared to the average power of the RF signal 107. In contrast, the actual output of the PA 140 (503), corresponding to symbol 111111 in Figure in FIG. 2, is separated from the ideal linear output 504 by a significant amount. The difference can be characterized as a distortion error vector 505, representing the amplitude and phase distortion of the PA 130 for that constellation point as illustrated in FIG. 5A and expanded in FIG. 5B.

Returning now to FIG. 1, after amplification by PA 140, the RF output signal 108 is delivered to the down-converter component 150. Down-converter component 150 includes a coupler 151, an attenuator 152, a mixer 153, the local oscillator 133, and an analog-to-digital converter (ADC) 154.

RF output signal 108 passes through coupler 151 to a transmit antenna (not shown), and a portion of the output signal 108 is coupled off as RF signal 109. RF signal 109 is attenuated by attenuator 152 to produce an RF signal 110 at the input of mixer 143 that is comparable in power level to RF signal 105, the modulated RF signal at the output of mixer 132 in the up-converter component 130. RF signal 110 is coherently downconverted to an analog baseband signal 111 using the same local oscillator signal 106 from local oscillator 133 that is used in the up-conversion process described above. It will be appreciated that the analog baseband signal 111 will be a distorted version of analog baseband data signal 104, reflecting any distortion introduced by PA 130.

Analog baseband signal 111 is then converted to digital signal form by ADC 154, reversing the digital to analog mapping performed by DAC 131. That is, ADC 154 maps a set of analog vectors, corresponding to down-converted sub-carriers, to a digital baseband signal 112, reflecting any distortion introduced by the PA 140. This distorted digital baseband signal (112) is compared with digital baseband data signal 102 in DPD calibration engine 124 as described below.

Figure 6:
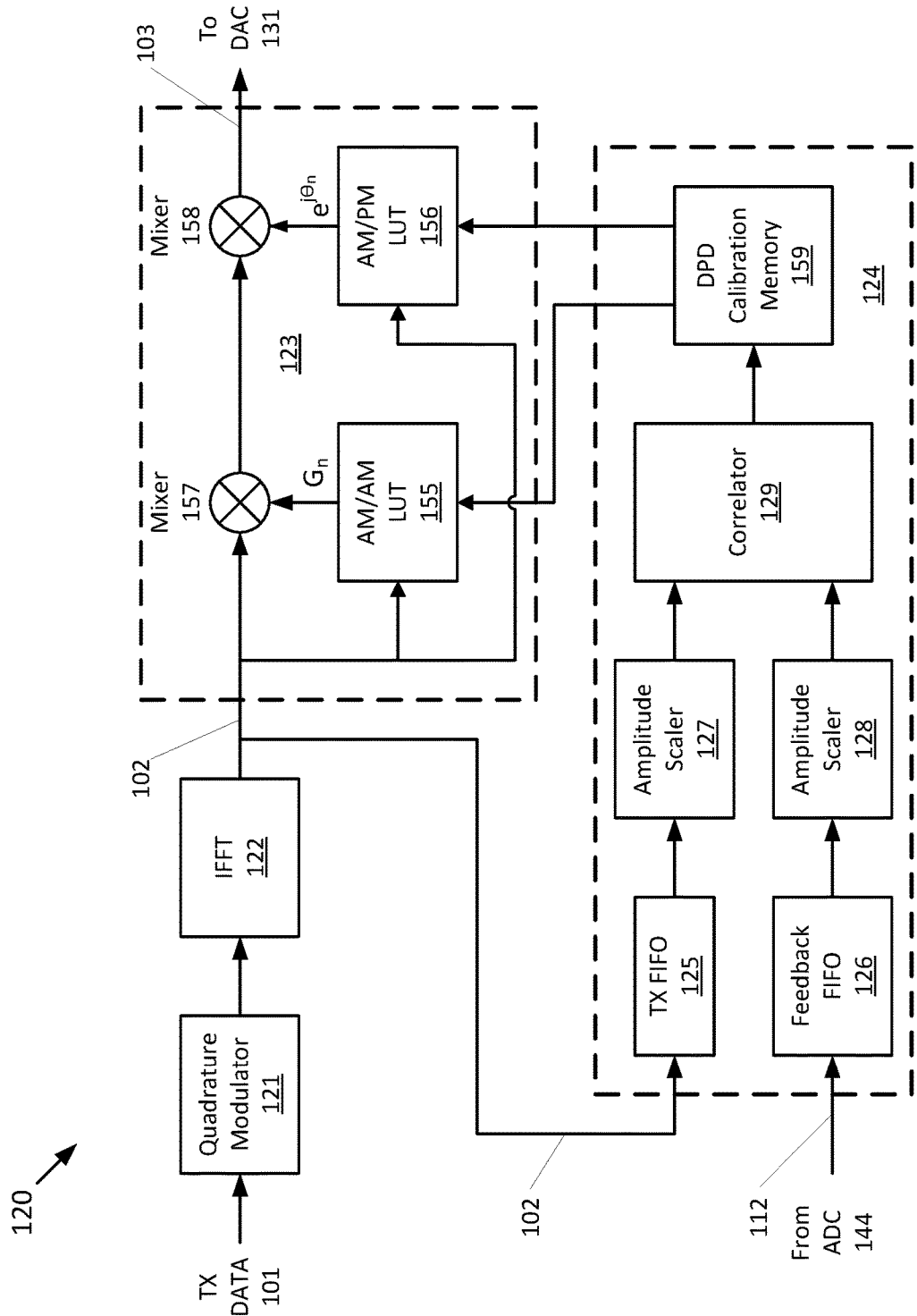
FIG. 6 is a block diagram illustrating an example subsystem for data-based pre-distortion for a nonlinear power amplifier according to the present disclosure.

FIG. 6 illustrates a detailed block diagram of DPD processing component 120. The DPD calibration engine 124 receives a copy of the digital baseband data signal 102 from IFFT block 122 as a stream of symbols in the time domain (e.g., 6-bit symbols in the exemplary case of a QAM-64 modulation scheme). DPD calibration engine 124 also receives distorted digital baseband signal 112, which carries any distortions introduced by PA 140. Digital baseband data signal 102 is applied to a transmit (TX) FIFO (first-in, first-out) buffer 125, and the distorted digital baseband signal 112 is applied to feedback FIFO buffer 126. The TX buffer 125 and the feedback buffer 126 can be used to align data frames to account for different time delays in the transmit and feedback signal paths. The digital baseband data signal 102 and the distorted digital baseband signal 112 are then equalized in amplitude by amplitude scaler 127 and amplitude scaler 128, respectively. Thereafter, digital baseband data signal 102 is compared with distorted digital baseband signal 112 in correlator 129, to determine the amplitude and phase distortion coefficients of the PA 140. In one example, correlator 129 matches low power symbols of the two data streams where there is little or no distortion, and then determines a distortion vector for each higher power symbol in the data streams. As described above with respect to FIG. 5A and FIG. 5B, each distortion vector may be expressed by a magnitude and phase component for each symbol in the constellation, such as in constellation 200 for example. In one example, the correlator 129 may use the magnitude and phase components in a recursive least squares/least mean squares (RLS/LMS) algorithm to fit the data to coefficients of a polynomial model of the power amplifier 140, such as a Volterra series, for example. The correlator 129 can use the coefficients to determine an amplitude pre-distortion coefficient and a phase pre-distortion coefficient for each symbol in the constellation, to compensate for the amplitude and phase distortion of PA 140.

Figure 7:
FIG. 7 is a table illustrating example pre-distortion coefficients according to the present disclosure.

To generate the pre-distortion coefficients required to compensate for the nonlinearity of PA 140, the correlator may be configured to change the phase of each distortion coefficient 180 degrees, effectively reversing the direction of the associated distortion vector and creating a pre-distortion vector that is equal and opposite to the modeled distortion vector. The resulting amplitude and phase pre-distortion coefficients may then be stored in a pre-distortion calibration table in DPD calibration memory 159 with a pre-distortion amplitude coefficient and a pre-distortion phase coefficient indexed to each data symbol in the constellation. FIG. 7 illustrates a pre-distortion calibration table 700 for the exemplary QAM-64 system, where $G_n$ is the pre-distortion amplitude component corresponding to the nth symbol in the constellation and $-\Theta n$ is the phase pre-distortion coefficient for the nth symbol in the constellation if $\Theta n$ is the corresponding phase distortion coefficient of the PA 140.

The pre-distortion amplitude coefficients are used to update an AM/AM lookup table (LUT) 155 in DPD processor 123, and the pre-distortion phase coefficients are used to update an AM/PM LUT 156 in DPD processor 123. As described above, DPD processor 123 receives the digital baseband data signal 102 as a stream of time domain symbols from IFFT block 122. Within DPD processor 123, signal 102 is applied to a digital mixer 157, and to AM/AM LUT 155, where each symbol in the data stream functions as a pointer to the corresponding amplitude pre-distortion coefficient in the table, which is then applied to the symbol as a digital gain factor Gn (corresponding to the nth entry in the lookup table) to the data stream in digital mixer 157.

The data stream 102 is also applied to AM/PM LUT 156, where each symbol in the data stream functions as a pointer to the corresponding phase pre-distortion coefficient in the table, which is then applied to the symbol as a digital phase factor $e^{j\Theta n}$, generating the pre-distorted digital baseband data signal 103.

It will be appreciated that before any data is transmitted, the DPD processor 123 and the DPD calibration engine 124 may have no way to generate pre-distortion coefficients. There are at least three ways this problem may be addressed. In one example, the initial amplitude and phase coefficients may be set to zero (i.e., no pre-distortion), and a one-time calibration signal may be transmitted to generate the coefficients. In another example, the system may be pre-loaded with amplitude and phase coefficients based on an approximate model of the PA 140. In another example, the system may be factory calibrated as part of the manufacturing, fabricating and programming process.

Figure 8:
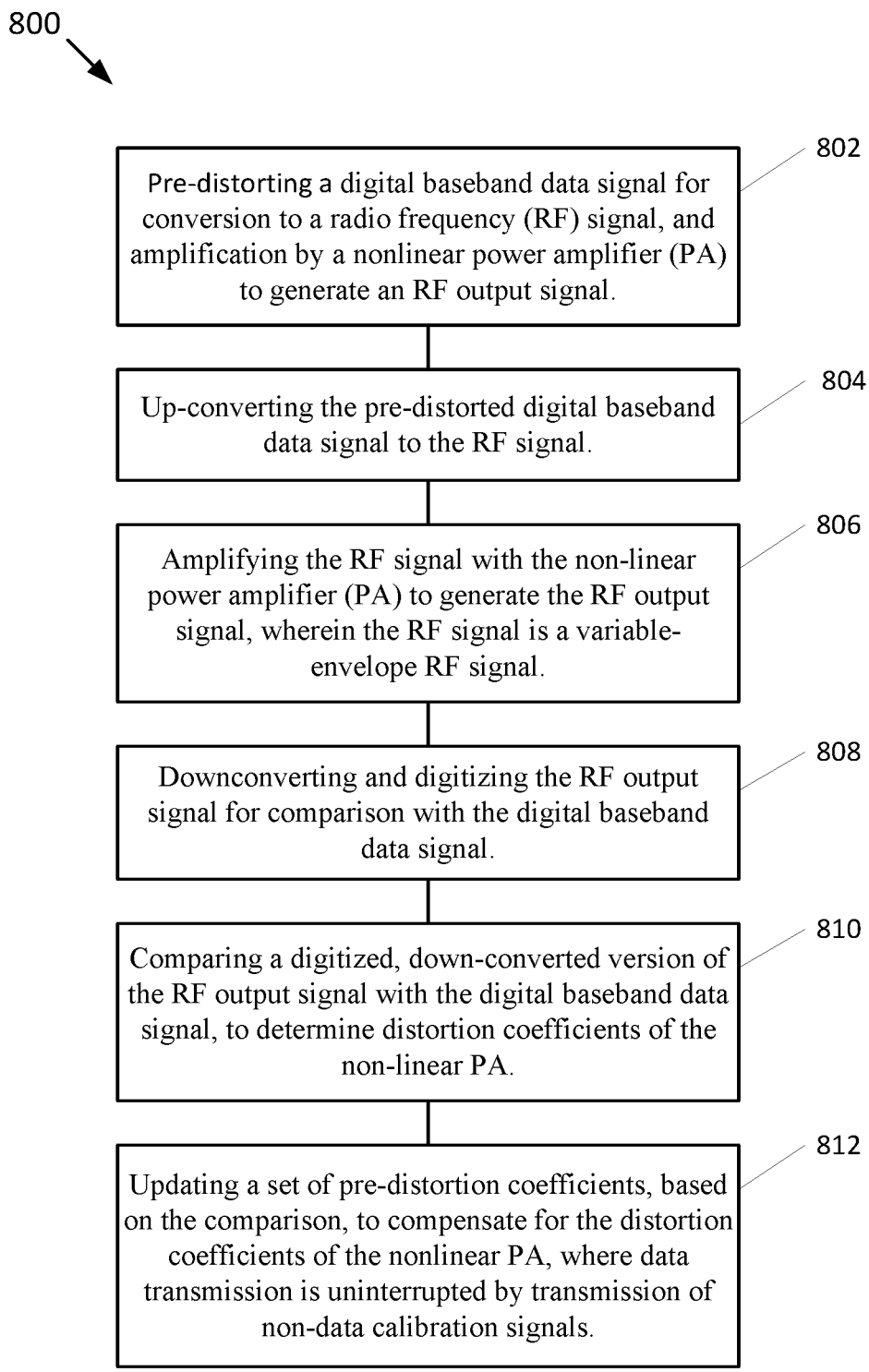
FIG. 8 is a flowchart illustrating an example method for data-based pre-distortion for a nonlinear power amplifier according to the present disclosure.

FIG. 8 is a flowchart illustrating an example method 800 according to the present disclosure for data-based digital pre-distortion for a non-linear power amplifier. Method 800 may be performed, for example, by system 100 described above. Method 800 begins at operation 802 by pre-distorting a digital baseband data signal (e.g., pre-distorting signal 102 in DPD processor 123) for conversion to a radio frequency (RF) signal, and amplification by a nonlinear power amplifier to generate an RF output signal. Method 800 continues at operation 804, which is up-converting the pre-distorted digital baseband data signal (e.g., signal 103) to the RF signal (e.g., signal 105 in up-converter component 130). At operation 806, method 800 continues by amplifying the RF signal with the non-linear power amplifier (e.g., PA 140) to generate the RF output signal (e.g. signal 108), wherein the RF signal is a variable-envelope RF signal. Next, method 800 continues at operation 808, downconverting and digitizing the RF output signal (e.g., in down-converter component 150) for comparison with the digital baseband data signal (e.g., in DPD calibration engine 124). At operation 810, method 800 continues by comparing a digitized, down-converted version of the RF output signal (e.g., signal 112) with the digital baseband data signal (e.g., signal 102), to determine distortion coefficients of the non-linear PA. Method 800 concludes at operation 812 by updating a set of pre-distortion coefficients (e.g., in LUT 155 and LUT 156), based on the comparison, to compensate for the distortion coefficients of the nonlinear PA, where data transmission is uninterrupted by transmission of non-data calibration signals.

System 100 described above, may be realized in hardware, software, firmware or some combination thereof. System 100 may be realized as a chipset (i.e., a set of integrated circuits), as a system on a chip (SOC), or as a combination of integrated and discrete components. DPD processor 120 may include a special-purpose or general-purpose processor, and a non-transitory computer-readable medium with instructions that, when read by the processor, cause the processor to control and execute the various operations described herein with respect to system 100, and in particular the operations of method 800 described above.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein re shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated examples of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method, comprising:
pre-distorting a digital baseband data signal for conversion to a radio frequency (RF) signal, and amplification by a nonlinear power amplifier (PA) to generate an RF output signal, wherein the RF output signal is output to an antenna for transmission;
coupling a portion of the RF output signal to generate a second RF output signal;
comparing a digitized, down-converted version of the second RF output signal with the digital baseband data signal, to determine distortion coefficients of the nonlinear PA, wherein frames of the digitized, down-converted version of the second RF output signal and the digital baseband data signal are aligned using a separate dedicated buffer for each prior to the comparison, and wherein transmission of the RF output signal is not interrupted by transmission of non-data calibration signals; and
updating a set of pre-distortion coefficients, based on the comparison, to compensate for the distortion coefficients of the nonlinear PA.

2. The method of claim 1, further comprising:
up-converting the pre-distorted digital baseband data signal to the RF signal;
amplifying the RF signal with the non-linear power amplifier (PA) to generate the RF output signal, wherein the RF signal is a variable-envelope RF signal; and
downconverting and digitizing the second RF output signal for comparison with the digital baseband data signal.

3. The method of claim 1, wherein the distortion coefficients of the nonlinear PA are coefficients of a Volterra series representing an amplitude dependent nonlinearity of the nonlinear PA.
coefficients are either all zero or a default set of coefficients.

4. The method of claim 3, wherein coefficients in an initial set of pre-distortion coefficients are either all zero or a default set of coefficients.

5. The method of claim 3, wherein the coefficients of the Volterra series represent amplitude distortion and phase distortion of the RF output signal of the nonlinear PA as a function of input power of the nonlinear PA.

6. The method of claim 2, wherein up-converting the pre-distorted digital baseband data signal (PDD-BDS) comprises:
converting the PDD-BDS to an analog signal in a digital-to-analog converter (DAC);
modulating a local oscillator signal with the analog baseband signal in an RF mixer to generate the variable-envelope RF signal; and
amplifying the variable-envelope RF signal in an RF pre-amplifier.

7. The method of claim 6, further comprising:
sampling the RF output signal with an RF coupler to generate the second RF output signal;
coherently demodulating the second RF output signal with the local oscillator signal to generate an analog baseband version of the second RF output signal; and
converting the analog baseband version of the second RF output signal to the digitized, downconverted version of the second RF output signal.

8. A system, comprising:
a digital pre-distortion (DPD) component comprising a DPD processor and a DPD calibration processor, wherein the DPD processor is configured to apply a set of DPD coefficients to a digital baseband data signal, to generate a pre-distorted digital baseband data signal for conversion to a radio frequency (RF) signal and amplification by a nonlinear power amplifier (PA) to generate an RF output signal, wherein the RF output signal is output to an antenna for transmission; and
a coupler configured to sample the RF output signal to generate a second RF output signal, wherein the DPD calibration processor is configured to:
compare a digitized, down-converted version of the second RF output signal with the digital baseband data signal, to determine distortion coefficients of the non-linear PA, wherein frames of the digitized, down-converted version of the second RF output signal and the digital baseband data signal are aligned using a separate dedicated buffer for each prior to the comparison, and wherein transmission of the RF output signal is not interrupted by transmission of non-data calibration signals; and
update the set of pre-distortion coefficients in the DPD processor to compensate for the distortion of the non-linear PA.

9. The system of claim 8, further comprising:
an up-converter component, coupled with the DPD processor, configured to convert the pre-distorted digital baseband data signal into the radio frequency (RF) signal, wherein the RF signal is a variable-envelope signal;
the nonlinear power amplifier (PA), coupled with the up-converter component, configured to generate the RF output signal; and
a down-converter component, coupled with the PA and the DPD component, configured to convert the second RF output signal to the digitized, downconverted version of the second RF output signal.

10. The system of claim 8, wherein the distortion coefficients of the non-linear PA are coefficients of a Volterra series representing an amplitude dependent nonlinearity of the non-linear PA.

11. The system of claim 10, wherein coefficients in an initial set of pre-distortion coefficients are all zero or a predetermined set of default coefficients.

12. The system of claim 10, wherein the coefficients of the Volterra series represent amplitude distortion and phase distortion of the RF output signal of the non-linear PA as a function of input power.

13. The system of claim 9, wherein the up-converter component comprises:
a digital-to-analog converter (DAC) coupled with the DPD component, configured to convert the pre-distorted digital baseband data signal to an analog baseband signal;
a mixer coupled with the DAC, configured to modulate a local oscillator signal with the analog baseband signal to generate a variable-envelope RF signal; and
an RF pre-amplifier coupled with the mixer, configured to amplify the variable-envelope RF signal.

14. The system of claim 9, wherein the down-converter component comprises:
the coupler configured to sample the RF output signal;
an attenuator coupled with the coupler, configured to attenuate the second RF output signal;
a mixer coupled with the attenuator configured to coherently demodulate the second RF output signal with the local oscillator signal to generate an analog baseband version of the second RF output signal; and
an analog-to-digital converter coupled between the mixer and the DPD processing component, configured to convert the analog baseband version of the second RF output signal to the digitized, down-converted version of the second RF output signal.

15. A digital pre-distortion (DPD) processing component, comprising:
a quadrature modulator configured to receive a transmit data frame and to gene rate a symbol stream, wherein the transmit data frame comprises information to be transmitted to a receiver device;
an inverse fast Fourier transform (IFFT) block coupled to the quadrature modulator, configured to generate a digital baseband data signal;
a DPD calibration processor coupled to the IFFT block, configured to compare the digital baseband data signal from the quadrature modulator with a distorted version of the digital baseband data signal, and to generate DPD coefficients based on the comparison, wherein frames of the digital baseband data signal and the distorted version of the digital baseband data signal are aligned using a separate dedicated buffer for each prior to the comparison, and wherein transmission of the digital baseband data signal is not interrupted by transmission of non-data calibration signals; and
a DPD processor configured to receive the digital baseband data signal from the quadrature modulator and to pre-distort the digital baseband data signal using the DPD coefficients to compensate for the nonlinear distortions of the PA.

16. The DPD processing component of claim 15, wherein the DPD processor comprises:
an amplitude distortion look-up table (LUT) containing amplitude pre-distortion coefficients from the DPD calibration processor;
a phase distortion LUT containing phase pre-distortion coefficients from the DPD calibration processor;
a first digital mixer configured to receive the digital baseband data signal and the amplitude pre-distortion coefficients from the amplitude distortion LUT, and to generate an amplitude pre-distorted digital baseband data signal, wherein the digital baseband data signal provides an entry point to the amplitude distortion LUT;
a second digital mixer configured to receive the amplitude distorted digital baseband data signal from the first digital mixer and the phase pre-distortion coefficients from the phase distortion LUT, and to generate an amplitude and phase pre-distorted digital baseband data signal, wherein the amplitude distorted digital baseband data signal provides an entry point to the phase distortion LUT.

17. The DPD processing component of claim 15, wherein the DPD calibration processor comprises:
a transmit (TX) buffer configured to receive the digital baseband data signal from the quadrature modulation;
a feedback (FB) buffer configured to receive a distorted version of the digital baseband data signal derived from the output of a nonlinear power amplifier (PA);
a first amplitude scaler coupled to the TX buffer, configured to normalize an amplitude of the digital baseband data signal;
a second amplitude scaler coupled to the FB buffer, configured to normalize an amplitude of the distorted version of the digital baseband data signal;
a correlator coupled with the first and second amplitude scalers, configured to apply a recursive least mean squares algorithm to the digital baseband data signal and the distorted version of the digital baseband data signal to determine distortion coefficients of the non-linear PA and the DPD coefficients; and a DPD calibration table configured to store the DPD coefficients.

18. The DPD processing component of claim 15, wherein the DPD coefficients are coefficients of a Volterra series representing an amplitude dependent nonlinearity of the nonlinear PA.

19. The DPD processing component of claim 15, wherein the DPD coefficients are coefficients of a Volterra series representing an amplitude and time dependent nonlinearity of the nonlinear PA.

20. The DPD processing component of claim 15, wherein initial values of the DPD coefficients are zero or a predetermined set of default coefficients.

* * * * *